(12) United States Patent
Lee et al.

(10) Patent No.: US 8,341,682 B2
(45) Date of Patent: *Dec. 25, 2012

(54) REAL-TIME IMAGE MONITORING AND RECORDING SYSTEM AND METHOD

(75) Inventors: Meng-Yu Lee, Tainan County (TW); Chun-Yu Wang, Taichung County (TW)

(73) Assignee: Industrial Technology Research Institute, Hsinchu (TW)

( * ) Notice: Subject to any disclaimer, the term of this patent is extended or adjusted under 35 U.S.C. 154(b) by 708 days.

This patent is subject to a terminal disclaimer.

(21) Appl. No.: 12/463,499

(22) Filed: May 11, 2009

(65) Prior Publication Data

US 2010/0153770 A1 Jun. 17, 2010

(30) Foreign Application Priority Data

Dec. 16, 2008 (TW) .............................. 97149051 A

(51) Int. Cl.
*H04N 7/173* (2006.01)
(52) U.S. Cl. ..................................... 725/105; 348/211.3
(58) Field of Classification Search .................. None
See application file for complete search history.

(56) References Cited

U.S. PATENT DOCUMENTS

| | | | |
|---|---|---|---|
| 6,327,252 B1 * | 12/2001 | Silton et al. | 370/256 |
| 6,698,021 B1 | 2/2004 | Amini et al. | |
| 2004/0028391 A1 * | 2/2004 | Black et al. | 386/108 |
| 2005/0027801 A1 * | 2/2005 | Kashyap et al. | 709/204 |
| 2005/0152287 A1 * | 7/2005 | Yokomitsu et al. | 370/255 |
| 2007/0016590 A1 * | 1/2007 | Appleby et al. | 707/10 |
| 2007/0133539 A1 * | 6/2007 | Kang et al. | 370/392 |
| 2008/0247457 A1 * | 10/2008 | Cromwell et al. | 375/240.01 |
| 2008/0313450 A1 * | 12/2008 | Rosenberg | 713/2 |
| 2009/0092054 A1 * | 4/2009 | Compton et al. | 370/242 |
| 2010/0098072 A1 * | 4/2010 | Satterlee et al. | 370/389 |

FOREIGN PATENT DOCUMENTS

WO WO 2008/127194 10/2008
WO WO 2008127194 A1 * 10/2008

OTHER PUBLICATIONS

Yamamoto, et al.; "A Network-Supported Server Load Balancing Method: Active Anycast;" IEIC Trans Commun; Vo. E84-B, No. 6; Jun. 2001; pp. 1561-1568.

* cited by examiner

*Primary Examiner* — Lin Ye
*Assistant Examiner* — Dennis Hogue
(74) *Attorney, Agent, or Firm* — McClure, Qualey & Rodack, LLP

(57) ABSTRACT

A real-time image monitoring and recording system includes a plurality of IP cameras and a plurality of surveillance servers. The IP cameras and the surveillance servers can process anycast packets. The surveillance servers control the IP cameras and store data generated by the IP cameras. Peer-to-peer connection exists between the surveillance server and its neighboring surveillance servers. Any surveillance server stores configuration data of its neighboring surveillance servers rather than the configuration data of all the surveillance servers.

24 Claims, 10 Drawing Sheets

REAL-TIME IMAGE MONITORING AND RECORDING SYSTEM AND METHOD

This application claims the benefit of Taiwan application Serial No. 97149051, filed Dec. 16, 2008, the subject matter of which is incorporated herein by reference.

TECHNICAL FIELD

The invention relates in general to a surveillance system and a monitoring method, and more particularly to anycast-based scalable and resilient surveillance system and method.

BACKGROUND

Image surveillance systems have been widely applied to various occasions, such as security applications (financial institutions) and manufacturing applications (factories). The scale of the image surveillance system is extended from a single hop to multi-hop, or even a real-time image surveillance system in various zones. As for the international enterprise, the image surveillance system must satisfy the real-time monitor and recording over different time zones and different zones all over the world.

From the point of view of the enterprise, a good real-time image monitor and recording system preferably has scalable flexibility. That is, when the scale of the enterprise rapidly extends, a good real-time image monitor and recording system may be scaled therewith.

The main key function of the real-time image monitor and recording system resides in the image privacy, the ease of read in either the real-time monitoring condition or the recorded video watching condition, the easy operation, and the easy system maintenance.

In the conventional analog image monitoring and recording system, the security level is low, i.e. the video tape can be easily taken away or damaged. In addition, it takes a lot of time to send the video tape to a remote site, so it is inconvenient. The scale of this conventional analog image monitoring and recording system cannot be easily enlarged. More particularly, this conventional analog image monitoring and recording system tends to be influenced by the human's improper operations. For example, a wrong video tape may be placed into the video recorder, the date and the location of the video tape may be incorrectly labeled, or the video tape may be incorrectly classified.

An improved image monitoring and recording system had been proposed to improve the prior art drawbacks. The system can establish the individual surveillance servers according to different camera groups, or may group the analog cameras into one group and then encode their output signals into digital signals to facilitate the management and storage. In addition, the user interface is simple because the image view site of the user is separated from the image storage site.

However, if the image file information is stored in an image database, then the response speed of the system may be slowed down due to that the stored data is severely increased.

SUMMARY

Consistent with the invention, there is provided a real-time image monitoring and recording system. The system includes a plurality of Internet protocol (IP) cameras and a plurality of surveillance servers. The IP cameras real-time generate video/audio data. The IP cameras have functions of processing anycast packets. The surveillance servers control the IP cameras and store the data generated by the IP cameras. The surveillance servers have functions of processing the anycast packets. A peer-to-peer connection exists between each of the surveillance servers and its neighboring surveillance servers. Each of the surveillance servers stores configuration data of its neighboring surveillance servers. During establishment of connections between the surveillance servers, the surveillance servers transmit the anycast packet to communicate with one another or each other. During establishment of connections between the surveillance servers and the IP cameras, the surveillance servers and the IP cameras transmit the anycast packet to communicate with one another.

Also consistent with the invention, there is provided a real-time image monitoring and recording method applied to a real-time image monitoring and recording system including a plurality of surveillance servers and a plurality of IP cameras. The method includes the steps of: establishing a peer-to-peer connection between each of the surveillance servers and its neighboring surveillance servers by transmitting anycast packets; storing configuration data of its neighboring surveillance servers in the surveillance servers; making the surveillance servers communicate with one another or each other; establishing connections between the surveillance servers and the IP cameras by transmitting anycast packets; controlling the IP cameras by the surveillance servers to real-time generate data; and storing the data generated by the IP cameras in the surveillance servers.

It is to be understood that both the foregoing general description and the following detailed description are exemplary and explanatory only and are not restrictive of the invention, as claimed.

DETAILED DESCRIPTION

In exemplary embodiments consistent with the present invention, there is provided a real-time image monitoring and recording system, in which all IP (Internet Protocol) cameras and surveillance servers have the functions of processing anycast packets. During establishment of connections between the surveillance servers, the surveillance servers transmit anycast packets to communicate with at least one another or even each other. During establishment of connections between the surveillance servers and the IP cameras, the surveillance servers and the IP cameras transmit anycast packets to communicate with one another.

In exemplary embodiments consistent with the present invention, there is provided a real-time image monitoring and recording system, in which the peer-to-peer connection, rather than the master-to-slave connection, exists between the surveillance server and its neighboring surveillance servers.

In the exemplary embodiment consistent with the invention, anycast-based scalable and resilient real-time image monitoring and recording system has the ability of self-repairing faults and further the network traffic load may be load-balanced.

Figure 1:
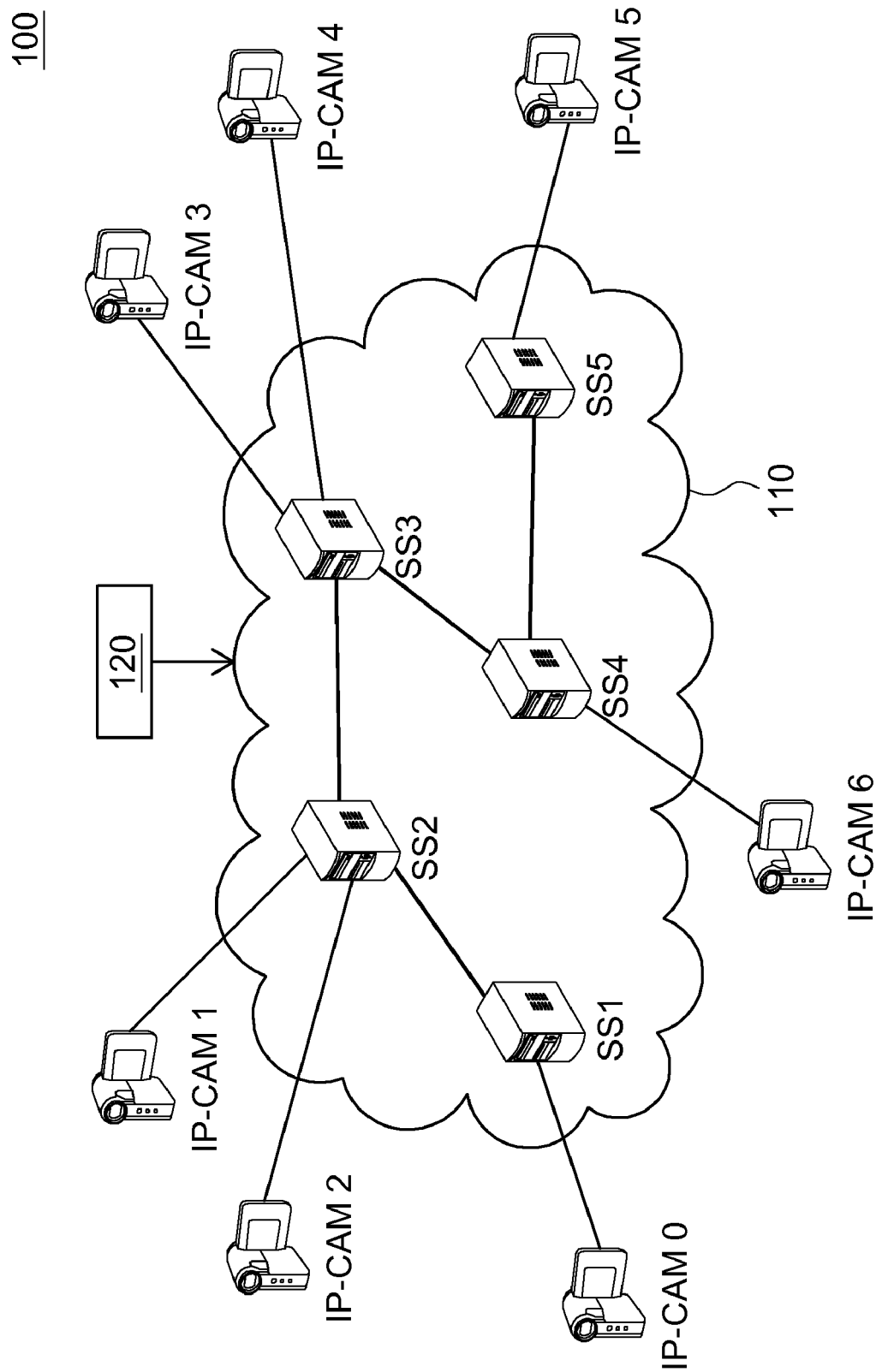
FIG. 1 is a schematic illustration showing an anycast-based scalable and resilient real-time image monitoring and recording system according to an exemplary embodiment consistent with the invention.

FIG. 1 is a schematic illustration showing an anycast-based scalable and resilient real-time image monitoring and recording system 100 according to an exemplary embodiment consistent with the present invention. Referring to FIG. 1, the real-time image monitoring and recording system 100 includes a plurality of Internet protocol (IP) cameras IP-CAM 0 to IP-CAM 6, a plurality of surveillance servers SS1 to SS5 and a user viewing subsystem 120. These surveillance servers constitute a flexible surveillance server control network (FSSCN) 110. One of ordinary skill in the art may understand that the disclosure is not particularly restricted by the quantity of the IP cameras and the surveillance servers. In addition, peer-to-peer connection exists between the neighboring surveillance servers in the exemplary embodiment consistent with the present invention, and the number of the IP cameras that may be controlled by each surveillance server is determined according to the bandwidth, traffic load and the computation ability of the surveillance server.

The IP cameras can real-time generate the video/audio data. In order to further compress the recorded video/audio data, the IP camera can generate the compressed video/audio streaming data and transfer the streaming data to the surveillance server so that the streaming data may be stored in the internal storage unit of the surveillance server. The IP camera receives control commands from the surveillance server to change its horizontal angle, tilt angle, zoom and frame sampling. The IP camera supports the anycast function. That is, the IP camera may output and process anycast packets. When the IP camera is powered on (firstly powered on or powered on again), the IP camera actively outputs a camera joining request (which is an anycast packet) to the FSSCN 110 (i.e., to all the surveillance servers) to inform that a new IP camera joins. In addition, when the IP camera receives a rejoining request, the IP camera outputs the camera joining request to the FSSCN 110.

The surveillance server performs the real-time monitoring function. In addition, the surveillance server controls the IP camera to enable the IP camera to perform the real-time image recording. In addition, the surveillance server receives commands from the user viewing subsystem 120 and transfers the commands to the IP camera to change the horizontal angle, tilt angle and zoom of the IP camera. The surveillance server supports the anycast function. That is the surveillance server may output and process anycast packets. Each surveillance server has its own identification code (ID code) or IP address. In this embodiment, each surveillance server may just store configuration data of its 2-hop neighboring surveillance servers.

The user viewing subsystem 120 provides a user interface for the user. The user viewing subsystem 120 may perform the remote real-time monitoring function through the surveillance server. In addition, the user viewing subsystem 120 may real-time watch the video/audio data or watch the recorded video/audio data through one of the surveillance servers.

When the user wants to query the data of a certain IP camera, the user may regard any one surveillance server as a starting point. This is because that the FSSCN has the peer-to-peer construction. Thus, the required data may be queried according to the peer-to-peer property.

In addition, when a new surveillance server wants to join in the FSSCN 110, the new surveillance server performs the surveillance server joining policy to join in the FSSCN 110. The details thereof will be described in the following.

In addition, when one or more surveillance servers find that the connections thereof have lost, these disconnected surveillance servers perform the surveillance server recovery policy to establish the connections again. The details thereof will be described in the following.

More particularly, when the surveillance server finds that it manages too many IP cameras, the surveillance server performs the IP camera re-allocation policy to ease its load. The details thereof will be described in the following.

In addition, the IP camera may also momentarily join in this system as long as the IP camera can output anycast packets at booting. A direct management surveillance server (or a direct manager of the IP camera) is the one which is in direct charge (i.e. direct manage) of the IP camera. In addition, messages are exchanged between the surveillance servers so that any surveillance server can read the data of the IP camera managed by another surveillance server.

At last, when the load of the surveillance server (i.e., the number of the managed IP cameras) is too nonuniform or too complicated, the IP camera re-allocation policy may be adopted to re-allocate the connection between the surveillance server and the IP camera. The details thereof will be described in the following.

Each surveillance server records three tables, i.e. a neighbor table, a query table and an IP camera history table (IP-CAM history table). The tables will be described in the following.

The neighbor table records the information associated with neighboring hops. Herein, the so-called neighboring hops include a 1-hop neighbor and a 2-hop neighbor. In this specification, the connection between two surveillance servers is referred to a hop. If no intermediate surveillance server exists between two surveillance servers, the two surveillance servers are referred to as 1-hop neighbors corresponding to each other. Taking FIG. 1 as an example, the 1-hop neighbors of the surveillance server SS4 are the surveillance server SS3 and the surveillance server SS5. The surveillance server SS2 is not regarded as the 1-hop neighbor of the surveillance server SS4 because at least one intermediate hop (SS3) exists between the surveillance server SS2 and the surveillance server SS4.

Similarly, if only one intermediate surveillance server exists between the two surveillance servers, the two surveillance servers are referred to as 2-hop neighbors corresponding to each other. Taking FIG. 1 as an example, the 2-hop neighbor of the surveillance server SS4 are the surveillance server SS2. The surveillance server SS1 is not regarded as the 2-hop neighbor of the surveillance server SS4 because two intermediate hops (SS3 and SS2) exist between the surveillance server SS1 and the surveillance server SS4.

Taking the surveillance server SS4 as an example, its neighbor table is listed in the following Table 1.

TABLE 1

| Join time: 20080708, 11:23 AM | | | |
|---|---|---|---|
| 1-hop | | link cost | join time |
| SS3 | | 5 | 20080708, 10:00 AM |
| SS5 | | 5 | 20080708, 12:00 AM |
| 2-hop | FROM | link cost | join time |
| SS2 | SS3 | 12 | 20080708, 11:00 AM |

In Table 1, the field "1-hop" records the 1-hop neighbor of the surveillance server SS4, and the field "2-hop" records the 2-hop neighbor of the surveillance server SS4. The field "link cost" records the link cost between two surveillance servers (e.g., transmission delay time between the two surveillance servers). According to the link cost, it is possible to lower the possibility of forming a redundant link between the surveillance servers. The field "FROM (from which hop)" represents that the 2-hop neighbor is connected to the surveillance server SS4 through which 1-hop neighbor, and may also be referred to as the "link path".

The query table is an auxiliary table to query the video/audio file recorded by surveillance server. Taking the surveillance server SS4 as an example, its query table is listed in the following Table 2.

TABLE 2

| | |
|---|---|
| Direct | 6 |
| Indirect | 5, 3, 4\|1, 2, 0 |
| 1-hop | direct\|indirect 1\|indirect 2 |
| SS3 | 3, 4\|6, 1, 2\|0, 5 |
| SS5 | 5\|6\|3, 4, 1, 2, 0 |
| 2-hop | direct\|indirect 1\|indirect 2 |
| SS2 | 1, 2\|0, 3, 4\|6, 5 |

In the query table, the field "direct" represents the IP cameras directly controlled (managed) by the surveillance server. Taking FIG. 1 as an example, the IP camera directly controlled by the surveillance server SS4 is the IP-CAM 6. The field "indirect" represents the IP camera controlled by other surveillance servers, wherein the IP camera listed in front of the symbol "|" represents the IP camera directly controlled by the 1-hop neighbor thereof, while the IP camera listed in back of the symbol "|" represents the IP camera directly controlled by the other surveillance servers (not the 1-hop neighbor). Taking FIG. 1 as an example, the IP cameras directly controlled by the 1-hop neighbors (SS3 and SS5) of the surveillance server SS4 are IP-CAMs 5,3 and 4, while the IP cameras directly controlled by the other surveillance servers (not the 1-hop neighbor, that is, SS1 and SS2) are the IP-CAMs 1,2 and 0. The surveillance server SS1 directly controls the IP camera IP-CAM 0, while the surveillance server SS2 directly controls the IP camera IP-CAMs 1 and 2.

In the 1-hop associated field "direct|indirect 1|indirect 2", "direct" represents the IP camera directly controlled by the 1-hop neighbor of the surveillance server, and "indirect 1" represents the IP camera directly controlled by the 1-hop neighbor of the 1-hop neighbor of the surveillance server, while "indirect 2" represents the IP camera directly controlled by the x-hop neighbor (x≧2 and x is a positive integer) of the 1-hop neighbor of the surveillance server.

Taking FIG. 1 as an example, the IP cameras directly controlled by the 1-hop neighbor SS3 of the surveillance server SS4 are the IP-CAMs 3 and 4, so the field "direct" is filled with 3 and 4. The IP cameras directly controlled by the 1-hop neighbors (SS2 and SS4) of the 1-hop neighbor (SS3) of the surveillance server SS4 are IP-CAMs 1,2 and 6, so the field "indirect 1" is filled with 1, 2 and 6. The IP cameras directly controlled by the 2-hop neighbors (SS5 and SS1) of the 1-hop neighbor (SS3) of the surveillance server SS4 are the IP-CAMs 0 and 5, so the field "indirect 2" is filled with 0 and 5.

Similarly, in the 2-hop associated field "direct|indirect 1|indirect 2", "direct" represents the IP camera directly controlled by the 2-hop neighbor of the surveillance server, "indirect 1" represents the IP camera directly controlled by the 1-hop neighbor of the 2-hop neighbor of the surveillance server, and "indirect 2" represents the IP camera directly controlled by the x-hop neighbor of the 2-hop neighbor of the surveillance server. Accordingly, it is derived how to fill the 2-hop associated field "direct|indirect 1|indirect 2" with (1,2|0,3,4|6,5), and detailed descriptions thereof will be omitted.

The IP camera history table records the IP cameras previously and currently directly controlled by the surveillance server. That is, the surveillance server stores the video/audio files generated by the IP cameras, which are previously and currently directly controlled thereby. In other words, the IP camera history table records which IP cameras had been or being managed by the surveillance server, and also records this IP camera had been or being managed by which surveillance server.

Taking FIG. 1 as an example, the IP camera history table of the surveillance server SS4 is listed in the following Table 3.

TABLE 3

| IP-CAM | State | previous owner |
|---|---|---|
| IP-CAM 6 | Online | N/A |

The field "IP-CAM" represents the IP camera previously and currently directly controlled by the surveillance server. The field "state" represents the state of the IP camera. There are totally three states including "online", "offline" and "indirectly (i.e. indirect management)". The state "online" represents that the IP-CAM is being managed by the surveillance server. The state "offline" represents that this IP camera has been out of control of the real-time image monitoring and recording system 100 according to this embodiment. The state "indirectly" represents that this IP camera is currently managed by another surveillance server. If the state in Table 3 is "indirectly", it represents that this IP camera had been previously managed by the surveillance server (SS4). The field "previous owner" records that the IP camera had been managed by which surveillance servers. For example, after the state is changed from "offline" to "indirectly", the surveillance server SS4 transfers the field "previous owner" to other surveillance server, which is currently managing this IP camera. In addition, the surveillance server may update the IP camera history table thereof according to the query tables and the neighbor tables transferred from other surveillance servers.

In the exemplary embodiment consistent with the invention, the query tables and the neighbor tables are exchanged between the surveillance servers. After a certain IP camera (e.g., IP-CAM 6) becomes offline (e.g., crashed), the surveillance server managing this IP camera labels the field "state" in this own IP camera history table as "offline".

If the previous offline IP camera rejoins this system 100 and is managed by another surveillance server (e.g., SS2), the surveillance server (e.g., SS4), which had previously managed this IP camera, may know that this IP camera IP-CAM 6 reboots and joins after receiving the query table and the neighbor table transferred from another hop. If this IP camera is managed by the neighboring neighbor (1-hop neighbor or 2-hop neighbor) of the surveillance server SS4, the surveillance server SS4 directly sends the data (field "previous owner"), associated with this IP camera IP-CAM 6, in its own IP camera history table to the surveillance server SS2, which is currently managing this IP camera IP-CAM 6, and modifies the data (field "state") of this IP camera IP-CAM 6 into "indirectly".

On the other hand, it is assumed that the rejoining IP camera IP-CAM 6 is managed by the non-neighboring neighbor (not the 1-hop neighbor and the 2-hop neighbor, such as SS1) of the surveillance server SS4. After the surveillance server SS4 knows that this IP camera IP-CAM 6 is managed by the surveillance server SS1 (e.g., after the query table and the neighbor table transferred from the other hop are received), the surveillance server SS4 directly communicates with the surveillance server SS1. Thus, the surveillance server SS1 may update the data (field "previous owner"), associated with this IP camera IP-CAM 6, in this own IP camera history table. In addition, the surveillance server SS4 modifies the data (field "state") of this IP camera IP-CAM 6 in its own IP camera history table into "indirectly".

In this embodiment, there are a plurality of packets, for example, a surveillance server joining request packet, a surveillance server response request packet, a surveillance server echo packet, a surveillance server arriving request packet, a surveillance server connection request packet, an IP-CAM query request packet, a surveillance server information exchange request packet, a surveillance server re-connection request packet, a surveillance server disconnection request packet, a surveillance server re-configuration request packet, an IP-CAM re-joining request packet, an IP-CAM connection request packet, an IP-CAM response request packet, an IP-CAM echo request packet and an IP-CAM joining request packet. When a new surveillance server wants to join, the new surveillance server outputs the surveillance server joining request packet to the FSSCN. The surveillance server response request packets are response packets transferred between the surveillance servers. The surveillance server echo packet, transferred between the surveillance servers, tests whether other surveillance servers are still online. The surveillance server arriving request packet is transferred between the surveillance servers; and when a new surveillance server joins, the surveillance server connected to the new surveillance server outputs the surveillance server arriving request packet. When a new surveillance server joins, the new surveillance server outputs the surveillance server connection request packet to the surveillance server, which responds earliest. The IP-CAM query request packet is transferred between the surveillance servers; and when the data of a certain IP-CAM is to be queried, the IP-CAM query request packet is outputted through the surveillance server by the user. The surveillance server information exchange request packets may be used in exchanging the neighbor table and the query table between the surveillance servers; and further the IP-CAM history table may be updated. The surveillance server re-connection request packet, transferred between the surveillance servers, is for the re-connection (when the disconnection fault is repaired). The surveillance server offline request packet, transferred between the surveillance servers, is for reduction of the redundant connection. The surveillance server re-configuration request packet is transferred between the surveillance servers and is outputted when one surveillance server is re-configured. The IP-CAM re-joining request packet is outputted from the surveillance server to the IP-CAM to request the IP-CAM to rejoin in this system/FSSCN. The IP-CAM connection request packet is outputted from the surveillance server to the IP-CAM to request the IP-CAM to be connected to the surveillance server. The IP-CAM response request packet is outputted from the surveillance server to the IP-CAM to request the IP-CAM to respond to the surveillance server. The IP-CAM echo request packet is outputted from the surveillance server to the IP-CAM to test whether the IP-CAM is still online or not. The IP-CAM joining request packet is outputted from the IP-CAM to the overall system, and is outputted from a new IP-CAM when the new IP-CAM joins.

Among the above-mentioned request packets, the surveillance server joining request packet and the IP-CAM joining request packet pertain to the anycast packets, and other packets pertain to the TCP packets. That is, the connections (the connection between the surveillance server and the surveillance server, and the connection between the surveillance server and the IP camera) are established through anycast packets. The communications (the communication between the surveillance server and the surveillance server, and the communication between the surveillance server and the IP camera) are established through TCP packets, rather than anycast packets, in this exemplary embodiment consistent with the invention.

New Surveillance Server Joins

Figure 2:
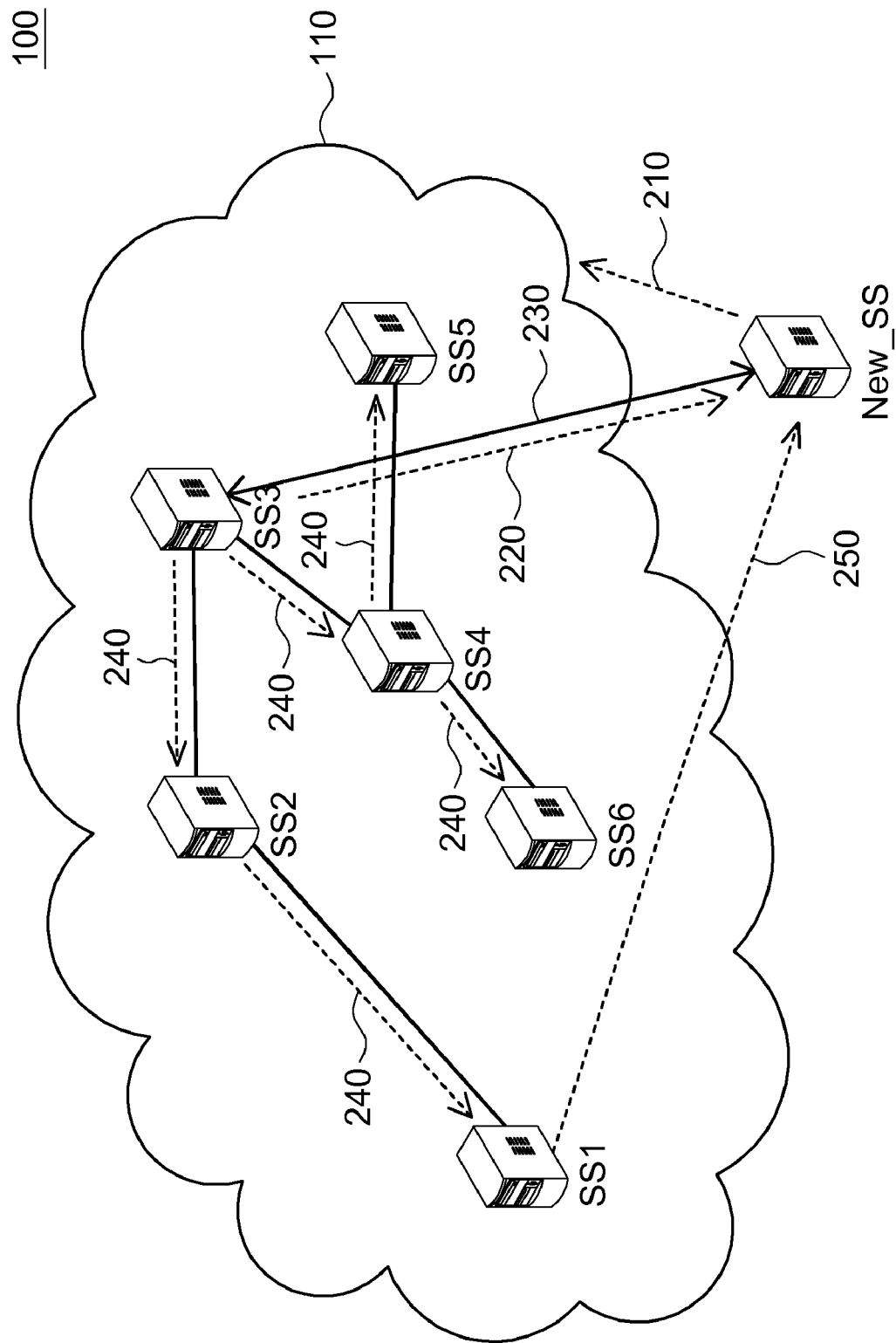
FIG. 2 is a schematic illustration showing that a new surveillance server joins according to the exemplary embodiment consistent with the invention.
Figure 3:
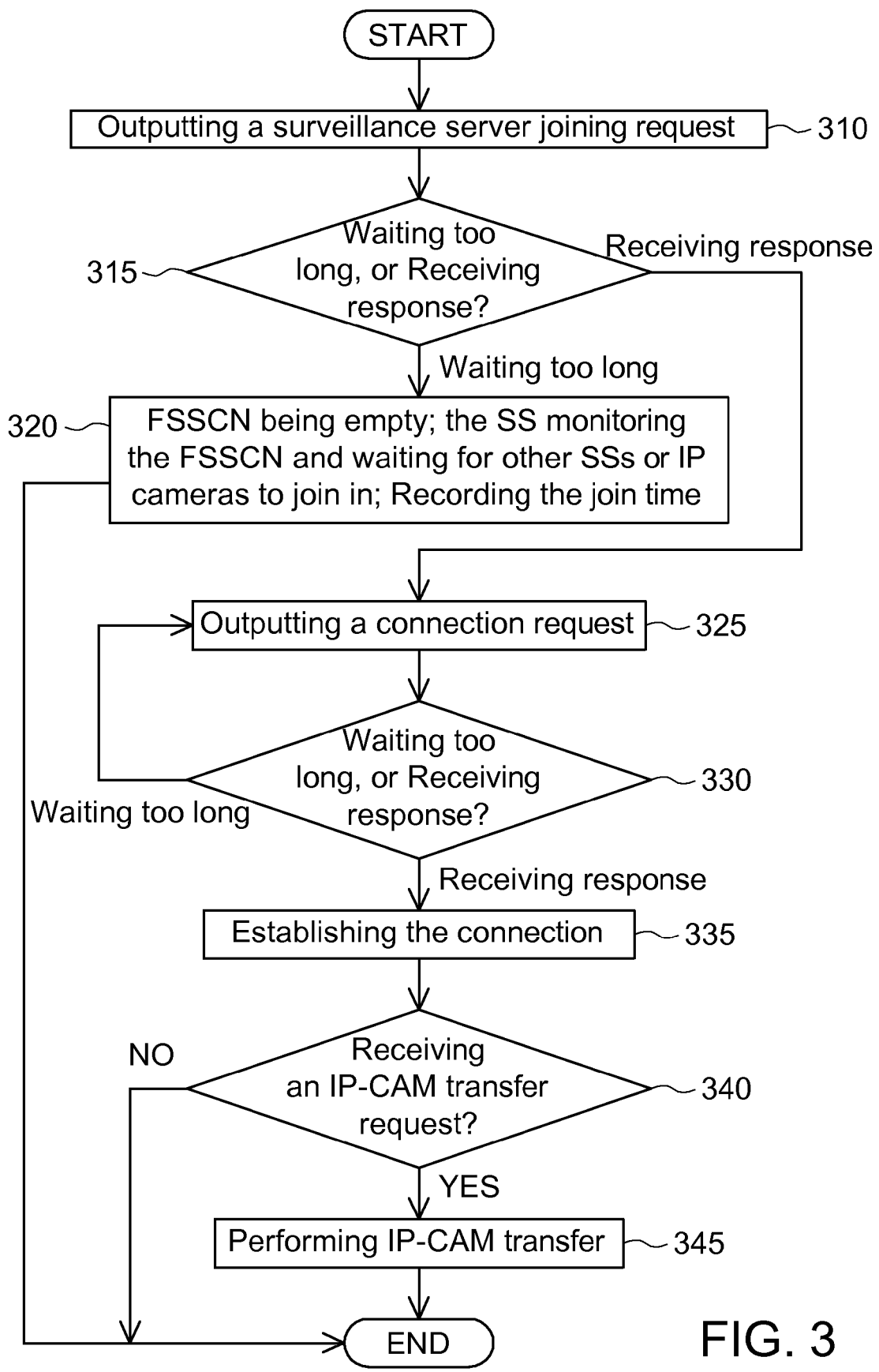
FIG. 3 is a flow chart corresponding to FIG. 2.

FIG. 2 is a schematic illustration showing that a new surveillance server joins according to the exemplary embodiment consistent with the invention. FIG. 3 is a flow chart corresponding to FIG. 2. In FIG. 2 and the following drawings, the solid line represents the peer-to-peer connection, while the dashed line represents the peer-to-peer communication. The following descriptions will be made with reference to FIGS. 2 and 3.

When a new surveillance server New_SS joins, the surveillance server New_SS outputs the surveillance server joining request, which is an anycast packet, to the FSSCN, as shown in the operation 210 of FIG. 2 and the step 310 of FIG. 3.

Next, this surveillance server New_SS judges whether any response from existing surveillance servers, or whether waiting time is too long, as shown in step 315 of FIG. 3. If the FSSCN is currently empty (no surveillance server exists), then the surveillance server New_SS will not receive any response. That is, the waiting time is too long. So, the surveillance server New_SS recognizes that it is the only one surveillance server in the current FSSCN. Next, the surveillance server New_SS starts to monitor the FSSCN, and waits for other surveillance servers or IP cameras to join. The surveillance server New_SS records its join time, as shown in step 320 of FIG. 3.

On the other hand, if the FSSCN is not currently empty (there is or are other surveillance server(s) inside it), then the surveillance server New_SS receives the response(s) from one or more surveillance servers, as shown in the operation 220 of FIG. 2. Herein, it is assumed that the surveillance server SS3 responds earliest. In this case, the surveillance server New_SS outputs the connection request to the earliest responding surveillance server, as shown in step 325 of FIG. 3.

Next, the surveillance server New_SS judges whether it receives the response from the surveillance server SS3, as shown in step 330 of FIG. 3. If the surveillance server New_SS waits too long (i.e. does not receive any response), the surveillance server New_SS continues outputting the connection request to the earliest responding surveillance server.

If the surveillance server New_SS receives the response from the surveillance server SS3 in response to the connection request, then the connection between the surveillance server New_SS and the surveillance server SS3 may be established, as shown in the operation 230 of FIG. 2 and the step 335 of FIG. 3. When the connection is being established, the surveillance server New_SS and the surveillance server SS3 exchange neighbor tables, query tables and IP camera history tables.

In addition, after the connection is established, the surveillance server SS3 outputs the new surveillance server arriving request packet to its neighboring neighbors (1-hop neighbor and 2-hop neighbor), as shown in the operation 240 of FIG. 2. If the surveillance server New_SS is re-activated (that is, the New_SS previously pertains to the system 100 but then offline due to other reasons (such as crash) and then rejoins in this system 100), the surveillance server New_SS transmits the IP camera history table to the surveillance server(s) which take over the IP camera previously managed by the surveillance server New_SS, through the exchange of the neighbor table and the query table, so that the taking over surveillance server(s) may update its/their own IP camera history table(s).

Next, the surveillance server New_SS judges whether IP-CAM transfer requests transferred from other surveillance servers are received, as shown in step 340 of FIG. 3. If the number of IP-CAMs managed by a certain surveillance server is or almost over-loaded, the surveillance server transfers the control rights of several IP-CAMs to the newly joining surveillance server when the surveillance server obtains that the new surveillance server joins. Herein, for example, the surveillance server picks the IP-CAMs to be transferred to the newly joining surveillance server according to the delay time (the transmission delay between two surveillance servers) and the data transmission amount.

If the IP-CAM transfer request transferred from other surveillance server is received, the IP-CAM transfer is performed, as shown in the operation 250 of FIG. 2 and the step 345 of FIG. 3. It is assumed that the surveillance server SS1 outputs the IP-CAM transfer request. When the IP-CAM transfer is to be performed, the surveillance servers SS1 and New_SS update their own neighbor tables, query tables and IP camera history tables.

In this embodiment, the newly joining surveillance server can be connected to the FSSCN without the need of obtaining the state information of all the surveillance servers.

New IP-CAM Joins

Figure 4:
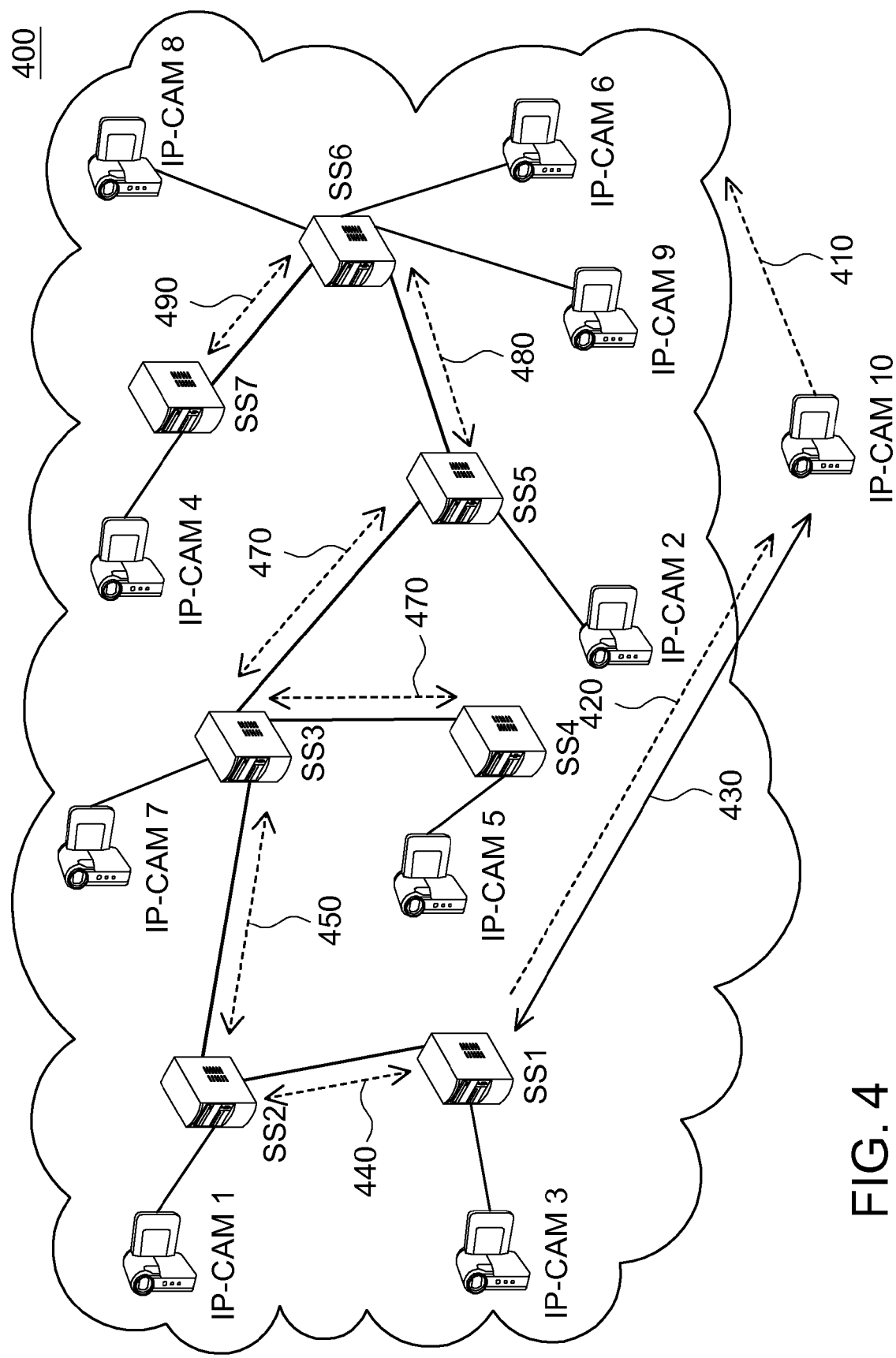
FIG. 4 is a schematic illustration showing that a new IP-CAM joins in the surveillance system according to the exemplary embodiment consistent with the invention.

How new IP-CAM joins to the surveillance system in this embodiment will be described in the following. Referring to FIG. 4, the surveillance system includes IP cameras IP-CAM 1 to IP-CAM 9 and a FSSCN, which includes surveillance servers SS1 to SS7.

When the IP camera IP-CAM 10 wants to join in the surveillance system 400, the IP camera IP-CAM 10 outputs the IP-CAM joining request packet to the FSSCN, as shown in the operation 410 of FIG. 4.

Next, all surveillance servers in the FSSCN consider their own conditions to determine whether to response. Herein, it is assumed that the surveillance server SS1 makes the response, so the surveillance server SS1 outputs the IP-CAM response request packet to the IP camera IP-CAM 10, as shown in the operation 420 of FIG. 4.

Next, the connection between the surveillance server SS1 and the IP camera IP-CAM 10 is established, as shown in the operation 430 of FIG. 4.

Next, messages are exchanged between the surveillance servers so that the other surveillance servers SS2 to SS7 know that the new IP camera IP-CAM 10 joins to the FSSCN, as shown in the operations 440 to 490 of FIG. 4. Herein, all surveillance servers in the FSSCN have obtained that the new IP camera IP-CAM 10 joins in the FSSCN.

IP-CAM Rejoin

Figure 5:
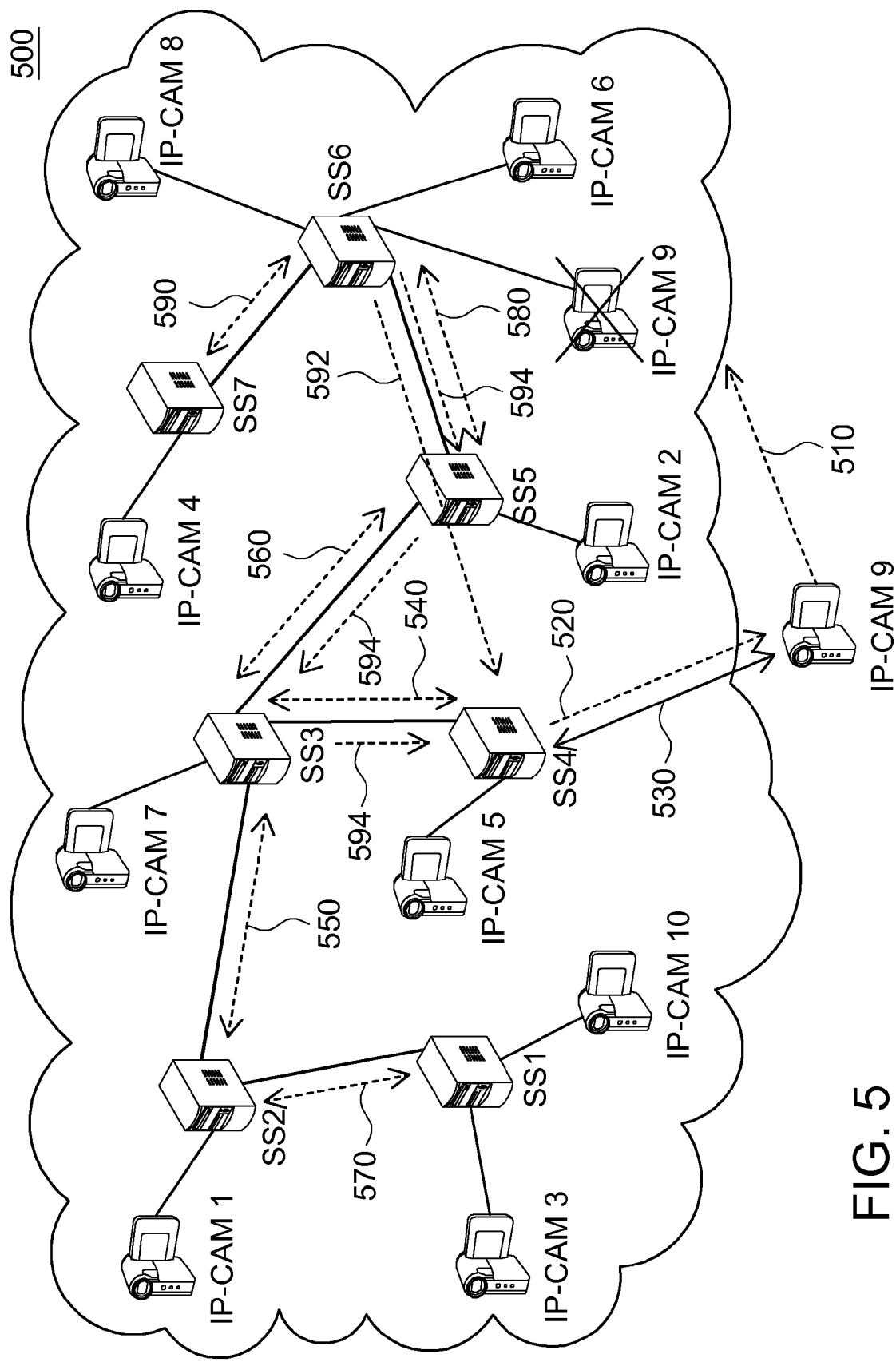
FIG. 5 is a schematic illustration showing that an IP-CAM rejoins in the surveillance system according to the exemplary embodiment consistent with the invention.

Herein, how the IP-CAM rejoins in the surveillance system in this embodiment will be illustrated in the following. Referring to FIG. 5, the surveillance system includes IP cameras IP-CAM 1 to IP-CAM 10 and a FSSCN, which includes surveillance servers SS1 to SS7.

It is assumed that the IP camera IP-CAM 9 is disconnected from the FSSCN due to some reasons (e.g., crash). Because the IP camera IP-CAM 9 is originally managed by the surveillance server SS6, the surveillance server SS6 sets the state related to the IP camera IP-CAM 9 in its own IP-CAM history table as offline, and informs this message to its neighboring hops.

Thereafter, the failure of the IP camera IP-CAM 9 has been eliminated, so the IP camera IP-CAM 9 wants to rejoin in this FSSCN. When the IP camera IP-CAM 9 wants to rejoin in this surveillance system 500, the IP camera IP-CAM 9 outputs the IP-CAM joining request packet to this FSSCN, as shown in the operation 510 of FIG. 5.

Next, all the surveillance servers in this FSSCN consider their own conditions to determine whether to response. Herein, it is assumed that the surveillance server SS4 makes the response, so the surveillance server SS4 outputs the IP-CAM response request packet to the IP camera IP-CAM 9, as shown in the operation 520 of FIG. 5.

Next, the connection between the surveillance server SS4 and the IP camera IP-CAM 9 is established, as shown in the operation 530 of FIG. 4.

Then, messages are exchanged between the surveillance servers so that the other surveillance servers know that the IP camera IP-CAM 9 rejoins in the FSSCN, as shown in the operations 540 to 594 of FIG. 5. In addition, the operation 594 occurs because the distance between the surveillance server SS6 and the surveillance server SS4 is more than 2 hops (3 hops). When the surveillance server SS6 finds that the IP camera IP-CAM 9 rejoins, the surveillance server SS6 wants to query where the IP camera IP-CAM 9 is (i.e., to query which is currently manages the IP camera IP-CAM 9) so that the IP-CAM history tables are exchanged therebetween, and the operation of exchanging the IP-CAM history tables is shown in the operation 592 of FIG. 5. Heretofore, all the surveillance servers in the FSSCN have obtained that the IP camera IP-CAM 9 rejoins in the FSSCN.

Because of the rejoining of the IP camera IP-CAM 9, the surveillance server SS4 (the current manager) sets the state related to the IP camera IP-CAM 9 in its own IP-CAM history table as online, and adds the messages (i.e., the lists including the surveillance server SS6 and all the previous managers of the IP camera IP-CAM 9) transferred from the surveillance server SS6 into its own IP-CAM history table. In addition, the surveillance server SS6 (previous manager) sets the state of the IP camera IP-CAM 9 in its own IP-CAM history table as "indirectly" (indirect management). In addition, this information (the surveillance server SS6 previously managed the IP camera IP-CAM 9) still has to be kept in the IP-CAM history table of the surveillance server SS6 unless the system is reset, or the user manually deletes this information.

Recovery Mechanism

How the system recovery is performed when a certain surveillance server becomes offline/crashed in this embodiment will be described in the following. This can prevent the other surveillance servers from becoming an isolated surveillance server, which is not connected to the FSSCN although it is still normal, or from becoming isolated surveillance servers, which are not connected to the FSSCN although these surveillance servers are still normal.

Figure 6A:
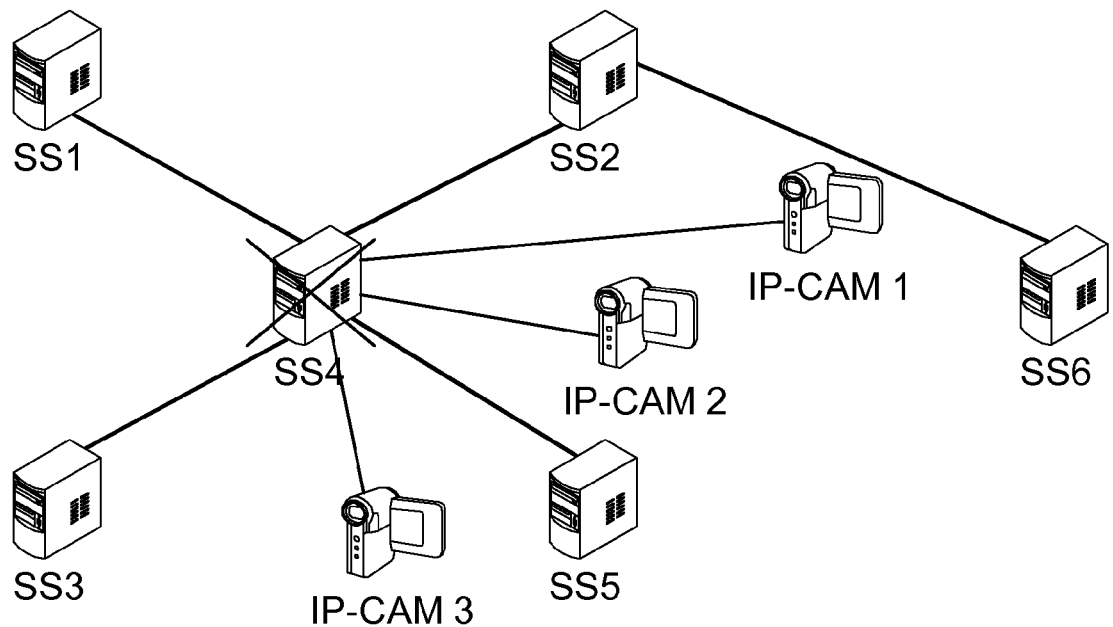
FIGS. 6A to 6E are schematic illustrations showing the repair when a surveillance server is offline according to the exemplary embodiment consistent with the invention.

FIGS. 6A to 6E are schematic illustrations showing the repair when an SS is disconnected (or offline) according to the exemplary embodiment consistent with the invention. In FIG. 6A, it is assumed that the surveillance server SS4 fails. So, the surveillance servers SS1, SS3 and SS5 become isolated because they do not connect to other surveillance servers.

When the surveillance server SS4 is failed, its neighboring neighbors cannot exchange the messages with the surveillance server SS4 for a long period of time. If so, other surveillance servers judge that the surveillance server SS4 had been disabled/failed, and the recovery mechanism is started.

Figure 6B:
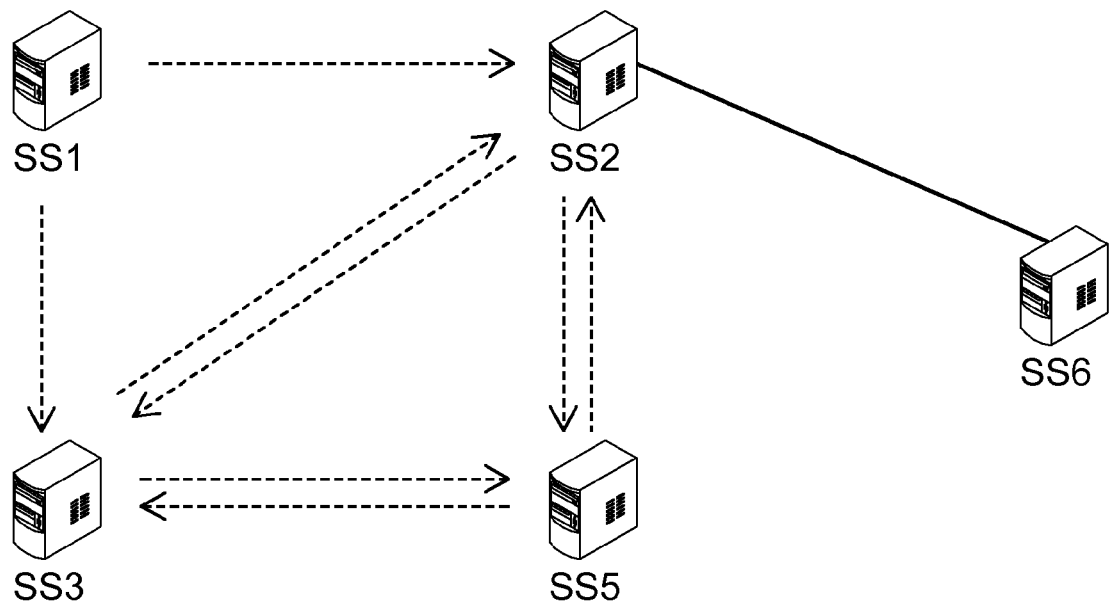

When the surveillance servers SS1, SS2, SS3 and SS5 find that the surveillance server SS4 had been disabled/failed, they send out the surveillance server re-connection request packets to their neighboring neighbors (2-hop neighbors). In FIG. 6A, the neighboring hops of the surveillance server SS1 include SS2, SS3 and SS5; and the neighboring hops of SS2 include SS1, SS3, SS5 and SS6. The surveillance server randomly selects ceil(n/2) among the neighboring hops to output the re-connection request packets, wherein the positive integer n refer to the number including the neighboring hops and the surveillance server outputting the request. In FIG. 6A, n is equal to 4, so the surveillance servers SS1, SS2, SS3 and SS5 need to randomly select two neighboring neighbors to output the surveillance server re-connection request packets, as shown in FIG. 6B.

Figure 6C:
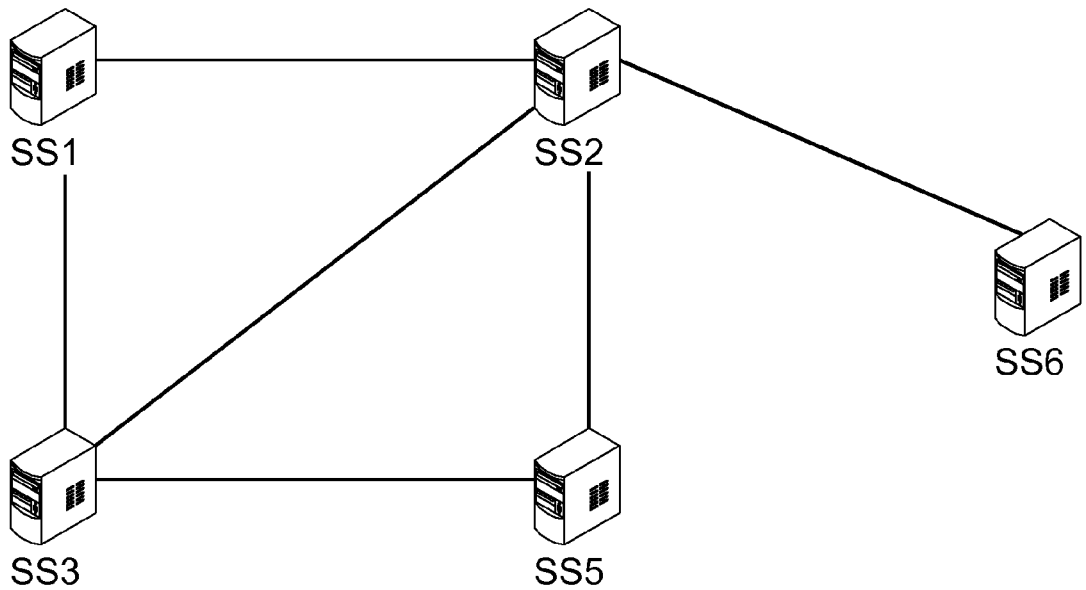
Figure 6D:
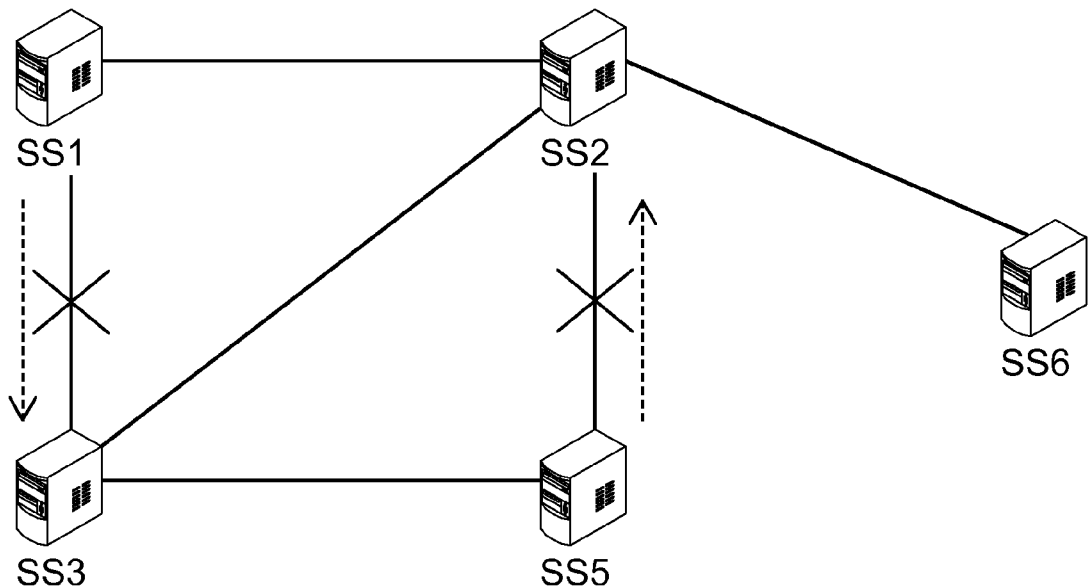

After receiving the surveillance server re-connection request packet, the surveillance server needs to be connected to the surveillance server outputting the surveillance server re-connection request packet, as shown in FIG. 6C. However, this may induce the redundant connection, which wastes the system resource. So, the redundant connections may be eliminated through the message exchange between the surveillance servers, as shown in FIG. 6D. After consideration of the connection delay and the load, it is assumed that the connection between the surveillance servers SS1 and SS3 and the connection between the surveillance servers SS2 and SS5 are redundant connections. So, these redundant connections may be eliminated.

In addition, it is assumed that the surveillance servers SS1 and SS2 are exchanging the messages. In this case, if the surveillance server SS3 outputs the message exchange request to the surveillance server SS1, the surveillance server SS1 cannot exchange the message with the surveillance server SS3 until the message exchange procedure between the surveillance servers SS1 and SS2 is finished. Thus, it is possible to prevent the appearance of the isolated surveillance server(s) during the elimination of the redundant connection.

Figure 6E:
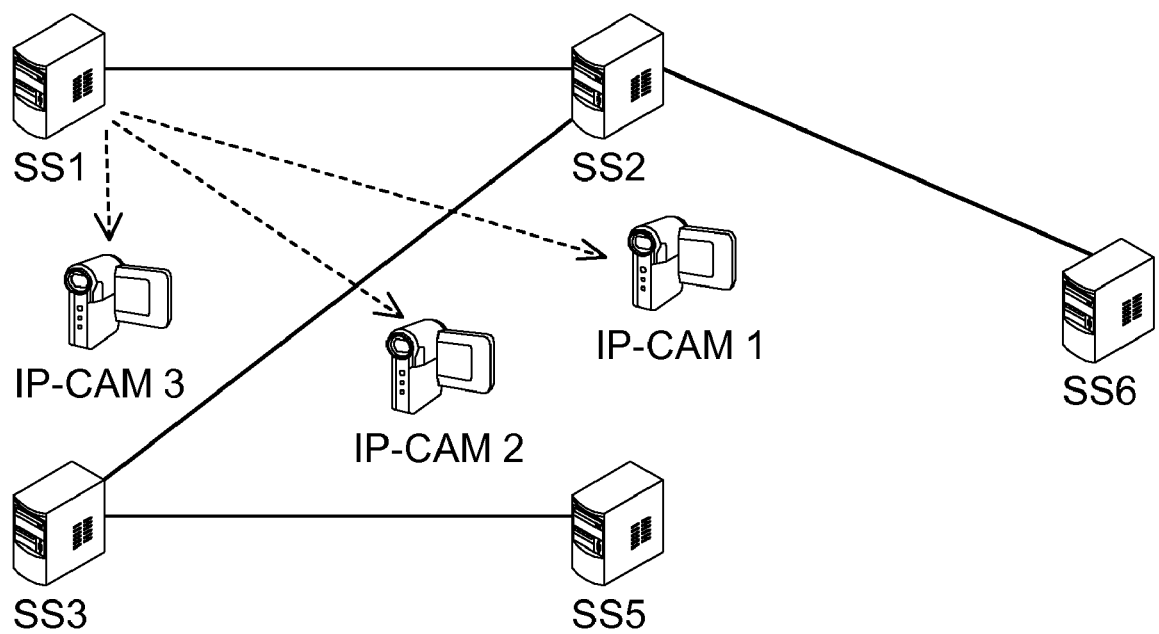

After the connection is established, a certain surveillance server (e.g., the surveillance server having the earliest join time) among this group of surveillance servers outputs the IP-CAM rejoining request packet to the IP-CAM 1 to IP-CAM 3 originally managed by the surveillance server SS4, as shown in FIG. 6E. Thereafter, the IP-CAM originally managed by the surveillance server SS4 may join in this surveillance system according to the above-mentioned IP-CAM join mechanism.

Figure 7A:
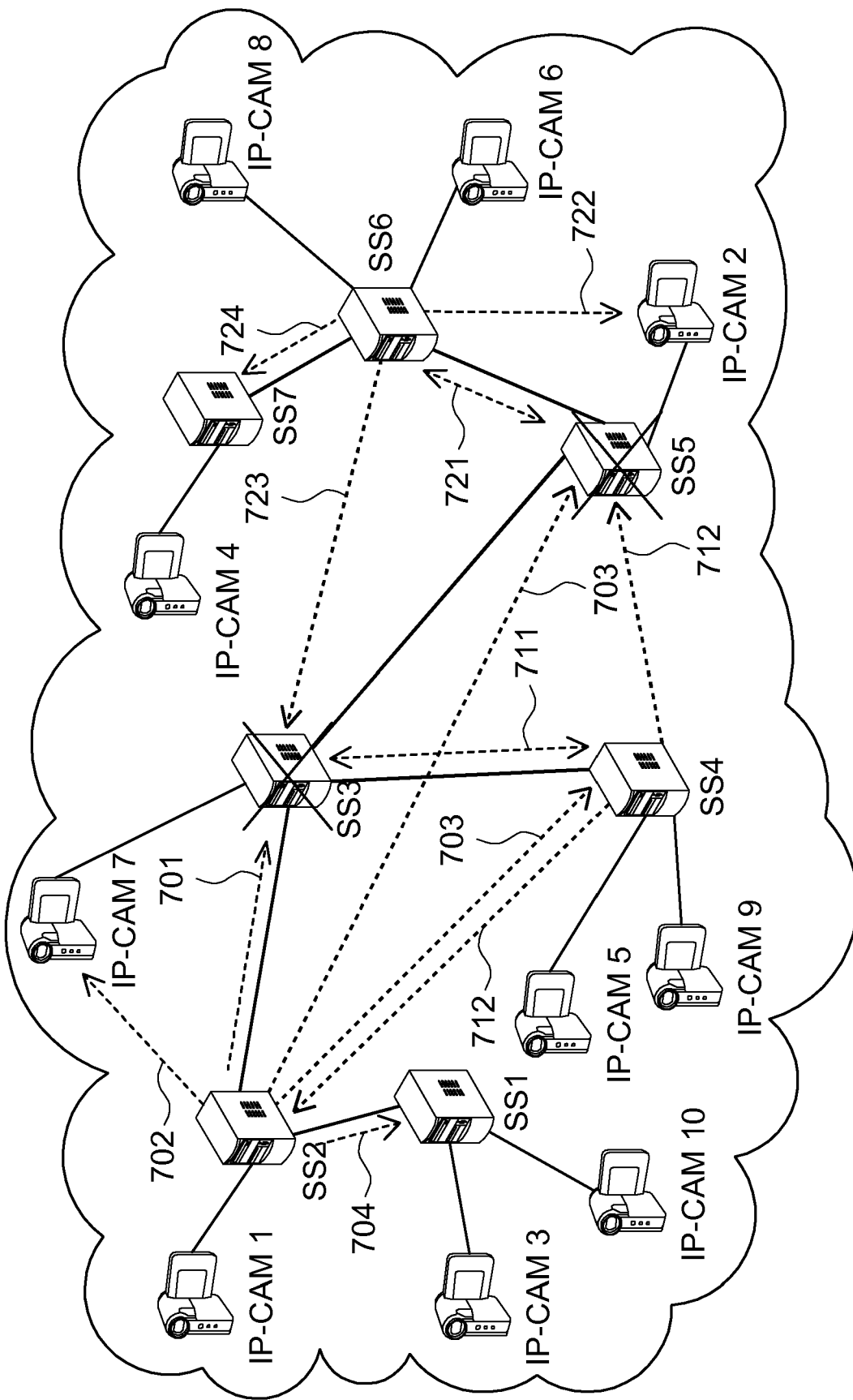
FIGS. 7A and 7B are schematic illustrations showing the repair when two surveillance servers are disconnected according to the exemplary embodiment consistent with the invention.
Figure 7B:
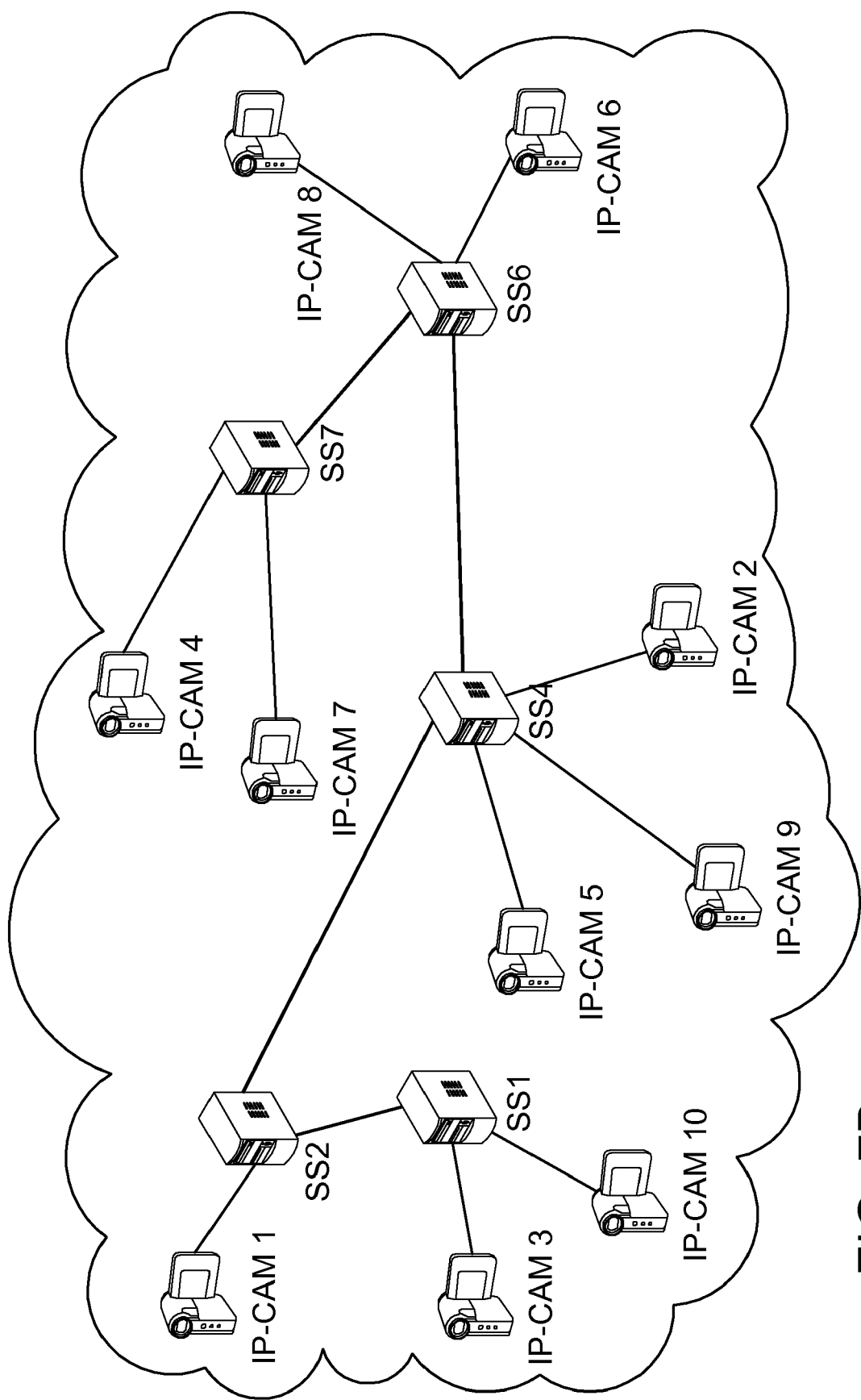

In addition, multiple (for example, 2) connected surveillance servers may fail or crash sometimes so that the other normal surveillance servers may become isolated. When this condition occurs, all the normal surveillance servers are forced to leave this system temporarily, and then rejoin in this system in this embodiment to prevent the other normal surveillance servers from becoming isolated. FIGS. 7A and 7B are schematic illustrations showing the repair when multiple connected surveillance servers are disconnected (offline) according to the exemplary embodiment consistent with the invention.

As shown in FIG. 7A, it is assumed that the surveillance servers SS3 and SS5 fail, so the other surveillance servers in this system are regarded as isolated.

When the surveillance server SS3 is failed, the surveillance server SS2 outputs the surveillance server echo request packet to identify that the surveillance server SS3 has been disabled/failed, as shown in the operation 701. The surveillance server SS2 outputs the IP-CAM rejoining request packet to the IP-CAM 7 directly controlled by the surveillance server SS3, as shown in the operation 702. If among the 1-hop neighbors of the surveillance server SS3, the surveillance server SS2 is the earliest one joining in this system, then the surveillance server SS2 performs the operation 702.

The surveillance server SS2 outputs the surveillance server echo request packet to its own 2-hop neighbors SS5 and SS4 to identify whether the surveillance servers SS5 and SS4 fail, as shown in the operation 703. If the surveillance server SS5 does not respond, it represents that the connected surveillance servers (i.e., the surveillance servers SS3 and SS5 in FIG. 7A) fail together, and the surveillance server SS2 outputs the surveillance server re-configuration request packet to its 1-hop neighbor (SS1 in the example of FIG. 7A), as shown in the operation 704. If other normal surveillance servers are connected to the surveillance server SS1, the surveillance server SS1 also outputs the surveillance server re-configuration request packet to these surveillance servers. That is, each surveillance server in the isolated group always outputs the surveillance server re-configuration request packet to its 1-hop neighbor until all the surveillance servers (SS1, SS2 and SS4 in the example of FIG. 7A) in the isolated group know that they have to re-configure. Thereafter, the surveillance servers SS1 and SS2 temporarily leave this system and then rejoin in this system.

In the exemplary embodiment consistent with the invention, however, the order of the operations 702 to 704 is not limited thereto. For example, the re-configuration request packet may be firstly outputted, and then the IP-CAM rejoining request packet is outputted, without departing from the spirit and the scope of the invention.

Similarly, when the surveillance server SS3 is failed, the surveillance server SS4 outputs the surveillance server echo request packet to identify that the surveillance server SS3 is failed/crashed, as shown in the operation 711. Next, the surveillance server SS4 outputs the surveillance server echo request packet to its own 2-hop neighbors SS5 and SS2 to identify whether SS5 and SS2 fail, as shown in the operation 712. Thereafter, the surveillance server SS4 temporarily leaves this system and then rejoins in this system.

Similarly, when the surveillance server SS5 is failed, the surveillance server SS6 outputs the surveillance server echo request packet to identify that the surveillance server SS5 is disabled/failed, as shown in the operation 721. Next, the surveillance server SS6 outputs the surveillance server echo request packet to its own 2-hop neighbor SS3 to identify whether the surveillance server SS3 fails, as shown in the operation 723. The surveillance server SS6 checks its own neighbor table and finds that the surveillance server SS6 is not the earliest joined one among the 1-hop neighbors of the surveillance server SS5, but is the surveillance server SS3. So, the IP-CAM rejoining request packet has to be requested by the surveillance server SS3, but the surveillance server SS6 detects and finds that the surveillance server SS3 has failed. Next, the surveillance server SS6 outputs the IP-CAM rejoining request packet to the IP-CAM 2 directly controlled by the surveillance server SS5, as shown in the operation 722.

Similarly, if the surveillance server SS3 does not respond, it means that the connected surveillance servers fail together (i.e., the surveillance servers SS3 and SS5 in FIG. 7A), then the surveillance server SS6 outputs the surveillance server re-configuration request packet to its 1-hop neighbor (SS7 in the example of FIG. 7A), as shown in the operation 724. If there are other normal surveillance servers connected to the surveillance server SS7, then the surveillance server SS7 also outputs the surveillance server re-configuration request packet to these surveillance servers. That is, each of the surveillance servers in the isolated group always outputs the surveillance server re-configuration request packet to its 1-hop neighbor until all the surveillance servers (SS6 and SS7 in the example of FIG. 7A) in the isolated group obtain that the re-configuration has to be performed. Thereafter, the surveillance servers SS6 and SS7 temporarily leave this system and rejoin in this system later.

When all the normal surveillance servers temporarily leave this system and rejoin in this system later, the formed connection condition is shown in FIG. 7B.

User Query

Now please refer to FIG. 1. How the user performs the query through this surveillance system in this embodiment will be described. Herein, it is assumed that the user is connected to the surveillance server SS1.

If the user wants to query which surveillance server currently manages the IP camera IP-CAM 0. As shown in FIG. 1, the current surveillance server SS1 is directly controlling the IP camera IP-CAM 0, then the surveillance server SS1 informs the user about the image file list (including the filename information, date information and the like) of the IP camera IP-CAM 0. In addition, the surveillance server SS1 outputs the information (i.e., the IP camera history table), about which surveillance servers had been directly controlled the IP camera IP-CAM 0, to the user, so that the user can query the image file list of the IP camera IP-CAM 0 stored in other surveillance servers.

If the user wants to query which surveillance server currently manages the IP camera IP-CAM 1. As shown in FIG. 1, If the current surveillance server SS1 is not directly controlling the IP camera IP-CAM 1, then the surveillance server SS1 understands which surveillance server (the surveillance server SS2) is currently directly controlling the IP camera IP-CAM 1, according to its neighbor table, and transfers the user query information to the surveillance server SS2. Thereafter, the surveillance server SS2 transfers the image file list of the IP camera IP-CAM 1 stored therein to the user in a similar manner. In addition, the surveillance server SS2 transfers the information (i.e., its own IP camera history table) about which surveillance servers was previously directly controlled the IP camera IP-CAM 1 to the user so that the user can query the other surveillance servers to obtain the image file list of the IP camera IP-CAM 1 stored in the other surveillance servers.

If the user wants to query the image or video recorded by one of the IP cameras, the user can directly communicate with its (current and previous) managers to query data because the user can obtain the current and previous managers managing the IP camera through the above-mentioned query.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A real-time image monitoring and recording system, comprising:
    a plurality of Internet protocol (IP) cameras for real-time generating video/audio data, wherein the IP cameras process anycast packets; and
    a plurality of surveillance servers for controlling the IP cameras and storing data generated by the IP cameras, wherein the surveillance servers process anycast packets, a peer-to-peer connection exists between each of the surveillance servers and its neighboring surveillance servers, and each of the surveillance servers stores configuration data of its neighboring surveillance servers, wherein:
        during establishment of connections between the surveillance servers, the surveillance servers transmit anycast packets to communicate with one another or each other; and
        during establishment of connections between the surveillance servers and the IP cameras, the surveillance servers and the IP cameras transmit anycast packets to communicate with one another;
        wherein when a new surveillance server joins, the new surveillance server generates a surveillance server joining request packet in the form of an anycast packet and responsive to not receiving a response from another surveillance server, the new surveillance server records a join time.

2. The system according to claim 1, wherein if the new surveillance server receives response from the surveillance servers, the new surveillance server outputs a connection request packet to establish a peer-to-peer connection between the new surveillance server and the one of the surveillance servers outputting the response and to exchange information; and
    the one of the surveillance servers outputs a new surveillance server arriving request packet to its neighboring surveillance servers to inform that the new surveillance server joins.

3. The system according to claim 2, wherein one of the surveillance servers further outputs an IP camera transfer request packet to the new surveillance server to transfer control rights of the IP cameras.

4. The system according to claim 1, wherein when a new IP camera joins:
    the new IP camera outputs an IP camera joining request packet in the format of the anycast packet;
    one of the surveillance servers outputs an IP camera response request packet to the new IP camera in response;
    a connection between one of the surveillance servers and the new IP camera is established; and
    the surveillance servers exchange messages to make the other surveillance servers obtain that the new IP camera joins.

5. The system according to claim 1, wherein when one of the IP cameras becomes offline:
    a current manager of the offline IP camera updates its internal configuration data and informs its neighboring surveillance servers; and
    the surveillance servers exchange messages so that the other surveillance servers obtain that the IP camera becomes offline.

6. The system according to claim 5, wherein when the offline IP camera wants to rejoin:
    the offline IP camera outputs an IP camera joining request packet in the format of the anycast packet;
    one of the surveillance servers outputs an IP camera response request packet to the offline IP camera in response;
    a connection between the one of the surveillance servers and the offline IP camera is established;
    the surveillance servers exchange messages so that the other surveillance servers obtain that the offline IP camera rejoins; and
    a current manager and a previous manager of the offline IP camera update their internal configuration data.

7. A real-time image monitoring and recording system, comprising:
    a plurality of Internet protocol (IP) cameras for generating video/audio data; and a plurality of surveillance servers for controlling the IP cameras and storing data generated by the IP cameras;

wherein when one of the surveillance servers is judged, by at least one first subgroup of surveillance servers of the surveillance servers, as becoming offline, the first subgroup of surveillance servers being neighboring surveillance servers of the offline surveillance server, the first subgroup of surveillance servers output a surveillance server re-connection request packet to a second subgroup of surveillance servers of the surveillance servers, the second subgroup of surveillance servers being 2-hop neighboring surveillance servers of the first subgroup of surveillance servers;

connections between the second subgroup of surveillance servers and the first subgroup of surveillance servers are established; and redundant connections between the second subgroup of surveillance servers and the first subgroup of surveillance servers are eliminated through exchange of messages between the surveillance servers.

8. The system according to claim 7, wherein when the messages are being exchanged between a first surveillance server and a second surveillance server of the surveillance servers, a third surveillance server of the surveillance servers cannot exchange messages with the first surveillance server until the messages between the first and second surveillance servers are completely exchanged.

9. The system according to claim 7, wherein after the connections between the second subgroup of surveillance servers and the first subgroup of surveillance servers are established, a surveillance server of the first subgroup of surveillance servers, which has the earliest join time, outputs an IP camera rejoining request packet to the IP camera previously managed by the offline surveillance server so that the IP camera previously managed by the offline surveillance server rejoins.

10. A real-time image monitoring and recording system, comprising:

a plurality of Internet protocol (IP) cameras for generating video/audio data; and a plurality of surveillance servers for controlling the IP cameras and storing data generated by the IP cameras;

wherein when a first subgroup of surveillance servers of the surveillance servers are judged as becoming offline, all the other normal surveillance servers of the surveillance servers temporarily leave the real-time image monitoring and recording system, and then rejoin in the real-time image monitoring and recording system, wherein the first subgroup of surveillance servers comprise at least two neighboring surveillance servers connected to each other; and a normal surveillance server of the surveillance servers outputs an IP camera rejoining request packet to the IP camera previously managed by the first subgroup of surveillance servers, so that the IP camera previously managed by the first subgroup of surveillance servers rejoins.

11. A real-time image monitoring and recording system, comprising:

a plurality of Internet protocol (IP) cameras for generating video/audio data; and a plurality of surveillance servers for controlling the IP cameras and storing data generated by the IP cameras;

wherein each of the surveillance servers records:

first data representing which surveillance servers are its neighboring surveillance servers, a link cost between the neighboring two surveillance servers and a link path of its neighboring surveillance servers;

second data representing a management relationship between the IP cameras and the surveillance servers; and third data representing which IP cameras are previously and currently directly controlled by the surveillance server, and which IP cameras had been previously directly controlled by the surveillance servers.

12. A real-time image monitoring and recording system, comprising:

a plurality of Internet protocol (IP) cameras for generating video/audio data;

a plurality of surveillance servers for controlling the IP cameras and storing data generated by the IP cameras; and a user viewing subsystem for providing a user interface to perform a remote real-time monitoring function, wherein:

when a user operates the user viewing subsystem to query a current manager of one of the IP cameras, if one of the surveillance servers connected to the user viewing subsystem is the current manager of the one of the IP cameras, the current manager returns a data file list and a previous manager information of the one of the IP cameras to the user; and if the one of the surveillance servers connected to the user viewing subsystem is not the current manager of the one of the IP cameras, the one of the surveillance servers connected to the user viewing subsystem obtains the current manager of the one of the IP cameras according to its internal configuration data, and transmits user query information to the current manager, and the current manager returns the data file list and the previous manager information of the one of the IP cameras to the user; and after the user knows which one is the current manager, the user directly communicates with the current manager to query data generated by the one of the IP cameras.

13. A real-time image monitoring and recording method applied to a real-time image monitoring and recording system comprising a plurality of surveillance servers and a plurality of IP cameras, the method comprising the steps of:

establishing a peer-to-peer connection between each one of the surveillance servers and its neighboring surveillance servers by transmitting anycast packets;

storing configuration data of its neighboring surveillance servers in the surveillance servers;

making the surveillance servers communicate with one another or each other;

establishing connections between the surveillance servers and the IP cameras by transmitting anycast packets;

controlling the IP cameras by the surveillance servers to real-time generate data; and storing data generated by the IP cameras into the surveillance servers;

wherein when a new surveillance server joins, the new surveillance server generates a surveillance server joining request packet in the form of an anycast packet and responsive to not receiving a response from another surveillance server, the new surveillance server records a join time.

14. The method according to claim 13, wherein when the new surveillance server joins in the real-time image monitoring and recording system, the method further comprising the steps of:

making the new surveillance server output a connection request packet to establish a peer-to-peer connection between the new surveillance server and the one of the surveillance servers outputting the response and to exchange information if the new surveillance server receives response from the surveillance servers; and making the one of the surveillance servers output a new surveillance server arriving request packet to its neighboring surveillance servers to inform that the new surveillance server joins.

15. The method according to claim 14, further comprising the step of:

making one of the surveillance servers further output an IP camera transfer request packet to the new surveillance server to transfer control rights of the IP cameras.

16. The method according to claim 13, wherein when a new IP camera joins in the real-time image monitoring and recording system, the method further comprising the steps of:

making the new IP camera output an IP camera joining request packet in the format of the anycast packet;

making one of the surveillance servers output an IP camera response request packet to the new IP camera in response;

establishing a connection between one of the surveillance servers and the new IP camera; and making the surveillance servers exchange messages to make the other surveillance servers obtain that the new IP camera joins.

17. The method according to claim 13, wherein when one of the IP cameras becomes offline, the method further comprising the steps of:

making a current manager of the offline IP camera update its internal configuration data and inform its neighboring surveillance servers; and making the surveillance servers exchange messages so that the other surveillance servers obtain that the IP camera becomes offline.

18. The method according to claim 17, wherein when the offline IP camera wants to rejoin, the method further comprising the steps of:

making the offline IP camera output an IP camera joining request packet in the format of the anycast packet;

making one of the surveillance servers output an IP camera response request packet to the offline IP camera in response;

establishing a connection between the one of the surveillance servers and the offline IP camera;

making the surveillance servers exchange message so that the other surveillance servers obtain that the offline IP camera rejoins; and making the current manager and a previous manager of the offline IP camera update their internal configuration data.

19. A real-time image monitoring and recording method applied to a real-time image monitoring and recording system comprising a plurality of surveillance servers and a plurality of IP cameras, wherein when one of the surveillance servers is judged, by at least one first subgroup of surveillance servers of the surveillance servers, as offline, the first subgroup of surveillance servers being neighboring surveillance servers of the offline surveillance server, the method comprising the steps of:

making the first subgroup of surveillance servers output a surveillance server re-connection request packet to a second subgroup of surveillance servers of the surveillance servers, wherein the second subgroup of surveillance servers are neighboring surveillance servers of the first subgroup of surveillance servers;

establishing connections between the second subgroup of surveillance servers and the first subgroup of surveillance servers; and eliminating redundant connections between the second subgroup of surveillance servers and the first subgroup of surveillance servers through exchanged messages between the surveillance servers.

20. The method according to claim 19, wherein:

when messages are being exchanged between a first surveillance server and a second surveillance server of the surveillance servers, a third surveillance server of the surveillance servers cannot exchange messages with the first surveillance server until the messages between the first and second surveillance servers are completely exchanged.

21. The method according to claim 19, wherein:

after the connections between the second subgroup of surveillance servers and the first subgroup of surveillance servers are established, a surveillance server of the first subgroup of surveillance servers, which has the earliest join time, outputs an IP camera rejoining request packet to the IP camera previously managed by the offline surveillance server so that the IP camera previously managed by the offline surveillance server rejoins.

22. A real-time image monitoring and recording method applied to a real-time image monitoring and recording system comprising a plurality of surveillance servers and a plurality of IP cameras, the method comprising the steps of:

when a first subgroup of surveillance servers of the surveillance servers are judged as becoming offline, all the other normal surveillance servers of the surveillance servers temporarily leave the real-time image monitoring and recording system, and then rejoin in the real-time image monitoring and recording system, wherein the first subgroup of surveillance servers comprises at least two neighboring surveillance servers connected to each other; wherein:

a normal surveillance server of the surveillance servers outputs an IP camera rejoining request packet to the IP camera previously managed by the first subgroup of surveillance servers so that the IP camera previously managed by the first subgroup of surveillance servers rejoins.

23. A real-time image monitoring and recording method applied to a real-time image monitoring and recording system comprising a plurality of surveillance servers and a plurality of IP cameras, the method comprising the steps of:

recording first data, second data and third data in each of the surveillance servers, wherein first data representing which surveillance servers are its neighboring surveillance servers, a link cost between the neighboring two surveillance servers and a link path of its neighboring surveillance servers;

second data representing which IP cameras are directly controlled by the surveillance server and which IP cameras are directly controlled by their neighboring surveillance servers; and third data representing which IP cameras are previously and currently directly controlled by the surveillance server, and which IP cameras had been previously directly controlled by the surveillance servers.

24. A real-time image monitoring and recording method applied to a real-time image monitoring and recording system comprising a plurality of surveillance servers and a plurality of IP cameras, wherein the real-time image monitoring and recording system comprises a user viewing subsystem, the method comprises the steps of:

when a user operates the user viewing subsystem to query a current manager of one of the IP cameras, if one of the surveillance servers connected to the user viewing subsystem is the current manager of the one of the IP cameras, the current manager returns a data file list and a previous manager information of the one of the IP cameras to the user; and if the one of the surveillance servers connected to the user viewing subsystem is not the current manager of the one of the IP cameras, the one of the surveillance servers connected to the user viewing subsystem obtains the current manager of the one of the IP cameras according to its internal configuration data, and transmits user query information to the current manager, and the current manager returns the data file list and the previous manager information of the one of the IP cameras to the user; and after the current manager is obtained, the user directly communicates with the current manager to query data recorded by the one of the IP cameras.

* * * * *